United States Patent [19]

Tanno et al.

[11] Patent Number: 4,625,378
[45] Date of Patent: Dec. 2, 1986

[54] METHOD OF MANUFACTURING FIN-TUBE HEAT EXCHANGERS

[75] Inventors: Satoshi Tanno; Hachiro Koma; Yukichi Aoki; Hironori Ito, all of Kusatsu; Hiroshi Yoneda, Daito; Shigeo Aoyama, Higashiosaka, all of Japan

[73] Assignee: Matsushita Refrigeration Company, Osaka, Japan

[21] Appl. No.: 815,749

[22] Filed: Dec. 31, 1985

Related U.S. Application Data

[63] Continuation of Ser. No. 585,212, Mar. 1, 1984, abandoned.

[30] Foreign Application Priority Data

| May 9, 1983 [JP] | Japan | 58-80344 |
| May 30, 1983 [JP] | Japan | 58-96348 |
| May 30, 1983 [JP] | Japan | 58-96349 |

[51] Int. Cl.⁴ .......................... B23P 15/26
[52] U.S. Cl. ..................... 29/157.3 A; 29/157.3 C; 29/157.3 D; 29/727
[58] Field of Search ............ 62/80, 283; 165/150; 74/579 R; 29/157.3 D, 157.3 A, 157.3 R, 157.3 C, 726, 727

[56] References Cited

U.S. PATENT DOCUMENTS

| 1,984,938 | 12/1934 | Mason et al. | 29/157.3 A |
| 2,156,538 | 5/1939 | Maynes | 29/727 X |
| 3,345,726 | 10/1967 | Hickman et al. | 165/150 X |
| 3,381,494 | 5/1968 | Steelman | 62/283 |

FOREIGN PATENT DOCUMENTS

| 14821 | 8/1966 | Japan | 29/157.3 A |
| 108956 | 8/1979 | Japan | 165/150 |
| 29606 | 7/1981 | Japan | |

Primary Examiner—Howard N. Goldberg
Assistant Examiner—Timothy V. Eley
Attorney, Agent, or Firm—Spencer & Frank

[57] ABSTRACT

A method of manufacturing a fin-tube heat exchanger which includes a multiplicity of plate fins arranged in a plurality of rows disposed at a predetermined pitch in the direction of air flow, and a jointless refrigerant pipe extending through the plate fins in a zigzag manner. Pipe-receiving holes are formed in each plate fin in an offset manner relative to the center of the plate fin. The plate fins are then placed in fin-receiving grooves formed in a straight fin positioning fixture at predetermined spacings such that the same longitudinal ends of the plate fins of alternating rows appear on the same side of the fin positioning fixture and such that the pipe-receiving holes are linearly aligned. The refrigerant pipe is inserted into the pipe-receiving holes and is expanded to make tight and close contact with the plate fins. The refrigerant pipe is bent in a zigzag manner so that the straight portiions of the pipe occupy corners of rectangles and so that a predetermined spacing is provided between the plate fins of adjacent rows. Finally, a twist is imparted to the refrigernat pipe to line up the plate fins and arrange the pipe such that the straight portions of the pipe are positioned in a staggered manner, as viewed in the direction of the rows.

9 Claims, 15 Drawing Figures

METHOD OF MANUFACTURING FIN-TUBE HEAT EXCHANGERS

This application is a continuation, of application Ser. No. 06/585,212, filed Mar. 1st, 1984, now abandoned.

BACKGROUND OF THE INVENTION

1. Field of the Invention

The present invention relates to a method of manufacturing a fin-tube heat exchanger which is suitably used as an evaporator of a refrigerator, show case or the like.

2. Description of the Prior Art

Heat exchangers of so-called fin-tube type are used in refrigerators, show cases and so forth. Generally, in such type of heat exchangers, plate fins are arranged at a predetermined pitch in the direction of air flow, i.e. in the direction of a row of the fins, while refrigerant pipes are arranged in an alternating or staggered manner in the direction of rows of the plate fins, so as to attain a boundary layer front edge effect and turbulence promotion effect thereby to improve the capability of the heat exchanger. This type of heat exchanger is shown, for example, in U.S. Pat. No. 3,381,494.

In the manufacture of such fin-tube heat exchangers in which plate fins in a row are arranged in non-alignment with plate fins in adjacent rows and straight portions of refrigerant pipe are arranged in a staggered manner as viewed in a direction of air flow, the plate fins and straight portions of refrigerant pipe are assembled together and then U-bends or return bends are connected by brazing to the ends of lengths of straight pipe so as to permit a refrigerant to flow in a zigzag manner. Thus, in terms of manufacture, such heat exchangers are not favorable due to the necessity of brazing work and inspection after the brazing and yet the fraction defective is considerably high.

On the other hand, such a heat exchanger having a continuous length of refrigerant pipe bent in a zigzag manner without the use of lengths of pipe having U-bends is known. The method of manufacturing this type of heat exchanger is disclosed in U.S. Pat. No. 2,156,538 or Japanese Patent Publication No. 29606/1981. By way of example, the manufacturing method as shown in Japanese Patent Publication No. 29606/1981 will be explained hereinunder with reference to FIGS. 1 to 4. A plate fin 1 is formed provided, at positions spaced equidistantly away from its upper and lower edges, with two pipe-receiving holes 3 for passing therethrough a length of refrigerant pipe 2. These plate fins are placed in fin-receiving grooves 4 which are formed at a predetermined pitch in a fin positioning fixture 5. More specifically, the plate fins 1 are of the same shape and are placed in the fin positioning fixture 5 in a manner shown in FIG. 1. Namely, a predetermined number of plate fins 1 (five fins in this case) are placed into every other groove 4 at a pitch designated at 6 and then, leaving out a predetermined number of grooves 4 (four grooves in this case) to provide that portion of the pipe which is bent to form U-bends, a predetermined number of plate fins 1 (nine fins in this case) are placed in the grooves 4 at the pitch 7 of the grooves 4. Then, leaving out a predetermined number of the grooves 4 to provide that portion of the pipe which is to be bent, the plate fins 1 are placed in respective grooves 4. Thus, the plate fins 1 are arrayed on a straight line. Subsequently, the refrigerant pipe 2 is inserted into the pipe receiving holes 3 of the plate fins 1 and is then expanded by inserting a tube expander, so that it is in close contact with the plate fins 1. Subsequently, the assembly of the refrigerant pipe 2 and the plate fins 1 is removed from the fixture 5 and is arcuately bent as at portions 8 (see FIG. 3) to make the refrigerant pipe 2 zigzag-shaped. Consequently, the plate fins 1 are arranged in parallel rows with gaps 9 between the adjacent rows. In the manufacture described above, the refrigerant pipe 2 is necessarily arranged to form squares in section transverse to the axial direction of the pipe since the plate fins 1 are lined up in the fin positioning fixture 5. Namely this manufacturing method is disadvantageous in that a staggered pipe arrangement which offers a high performance of the heat exchanger cannot be realized.

SUMMARY OF THE INVENTION

The invention aims at obviating these problems of the prior art.

Accordingly, it is a primary objectof the invention to provide a method of manufacturing a novel heat exchanger, in which a continuous length of refrigerant pipe is formed to provide a staggered arrangement, thereby obtaining a higher performance than that of heat exchangers produced by the conventional method.

Another object of the invention is to eliminate defects such as deformation, cracking and so forth in the refrigerant pipe which may be caused in realizing a staggered arrangement of the refrigerant pipe and which would impair the performance of a finished heat exchanger.

DETAILED DESCRIPTION OF THE PREFERRED EMBODIMENT

Figure 1:
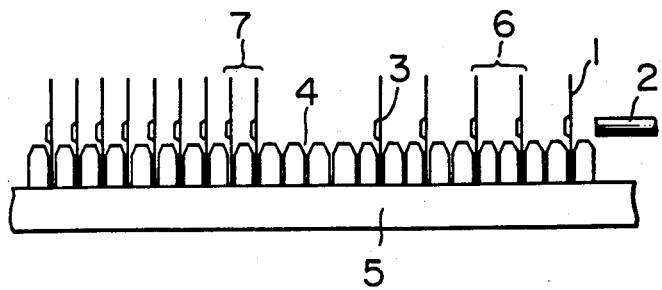
FIG. 1 is a side elevational view of a part of a fin-tube heat exchanger during the course of manufacture.
Figure 2:
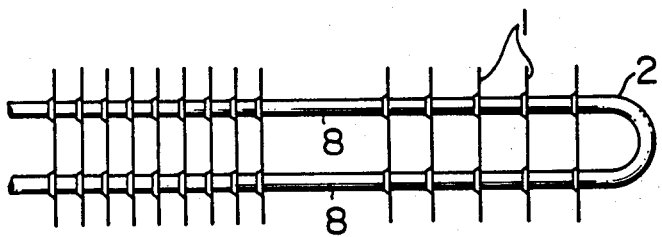
FIG. 2 is a top plan view of the part of the heat exchanger shown in FIG. 1.
Figure 3:
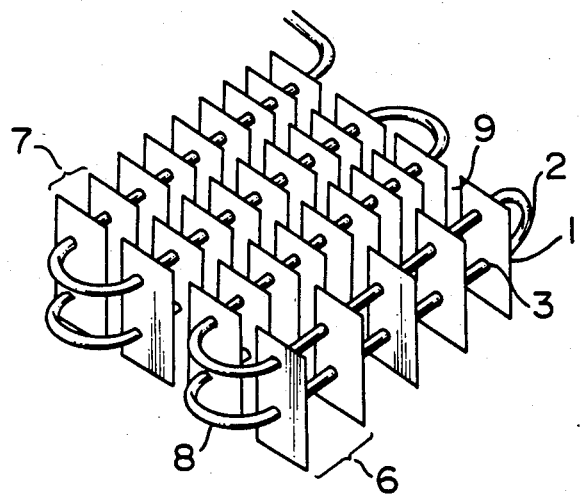
FIG. 3 is a perspective view of the finished part of the heat exchanger.
Figure 4:
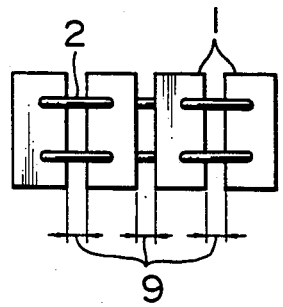
FIG. 4 is a side elevational view of the finished part of shown in FIG. 3.
Figure 5:
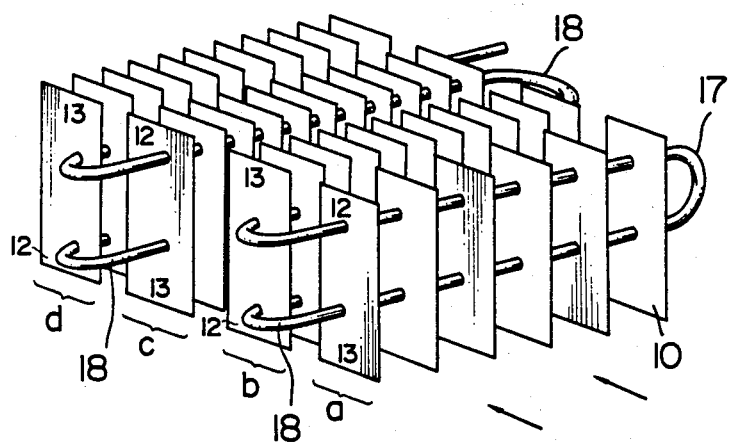
FIG. 5 is a perspective view of a fin-tube heat exchanger constructed according to the method of the invention.

A preferred embodiment of the invention will be described hereinunder with reference to the accompanying drawings. A fin-tube heat exchanger constructed in accordance with the method of the invention is shown FIG. 5. The heat exchanger shown in FIG. 5 is used as an evaporator for refrigerators. The heat exchanger comprises a multiplicity of plate fins 10 arranged at a constant pitch and a jointless refrigerant pipe 17 extending through plate fins 10 at a right angle to the latter. The plate fins 10 are grouped into independent rows a, b, c and d. The pitch of the plate fins 10 in the row a disposed upstream in the direction of air fow is selected to be greater than the pitch of the plate fins in the downstream-side rows b, c and d. That is, the upstream-side row a has a smaller number of plate fins 10 than that of other rows b, c and d. The refrigerant pipe 17 passes through the plate fins 10 of the rows a and c at higher positions than it does through the plate fins 10 of the rows b and c. That is, the refrigerant pipe 17 is arranged in a staggered manner in section transverse to the lengthwise direction.

A description will be made hereinunder as to the method of the invention for manufacturing the heat exchanger of the type shown in FIG. 5.

Figure 6:
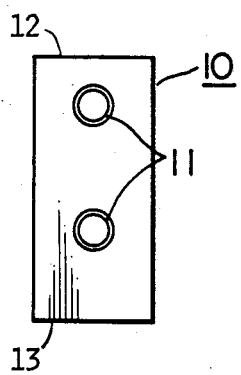
FIG. 6 is a plan view of a plate fin as used in the heat exchanger shown in FIG. 5.
Figure 7:
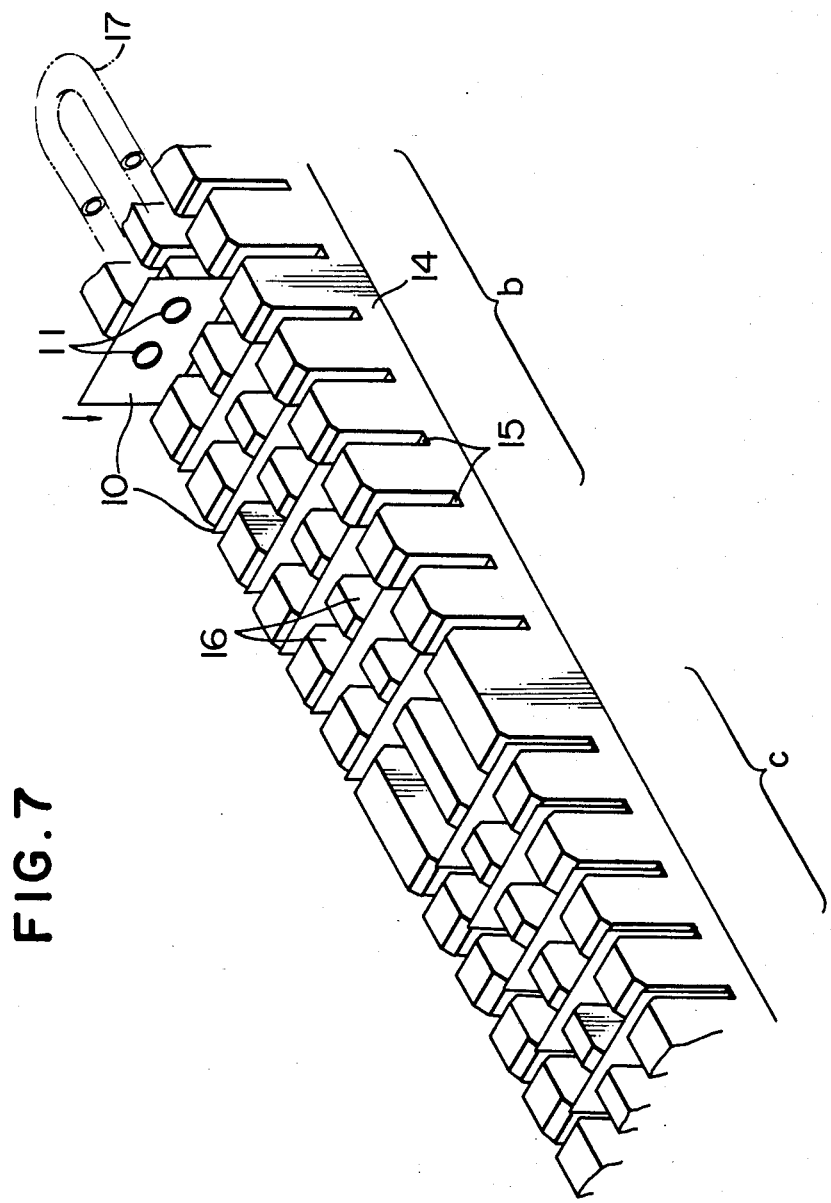
FIG. 7 is a perspective view showing the econd step of the method of the invention.

In the first step of the method, two pipe-receiving holes 11 are formed in each of a plurality of plate fins 10, as shown in FIG. 6. The holes 11 are spaced from each other in the longitudinal direction of the plate fins 10 and are offset to one longitudinal end of the same. The end 13 spaced from the adjacent end by a greater distance will be referred to as "longer end" while the end 12 spaced by a smaller distance from the adjacent end will be referred to as "shorter end", hereinunder. As shown in FIG. 7, there is provided a fin positioning fixture 14 which comprises fin-receiving grooves 15 for receiving the plate fins 10 and pipe receiving grooves 16 for receiving the refrigerant pipe 17. In the second step of the method, plate fins 10 are placed in the fin-receiving grooves 15 such that the longer ends 13 and the shorter ends 12 of the fins appear on opposite sides in every adjacent row and such that the pipe-receiving holes 11 are aligned with the pipe-receiving grooves 16. More specifically, the fins in the rows a and c are disposed on the fin positioning fixture 14 such that the longer ends 13 thereof appear on this side in FIG. 7 while, in the rows b and d, the longer ends 13 of the plate fins 10 appear on the other side in FIG. 7. Subsequently, in a third step of the method, a jointless refrigerant pipe bent in U-shaped configuration is inserted through the aligned pipe-receiving holes 11 in the plate fins 10. Then, a tube expander such as a mandrel (not shown) is inserted into the refrigerant pipe 17 to expand and secure same in tight contact with the plate fins 10.

Figure 8:
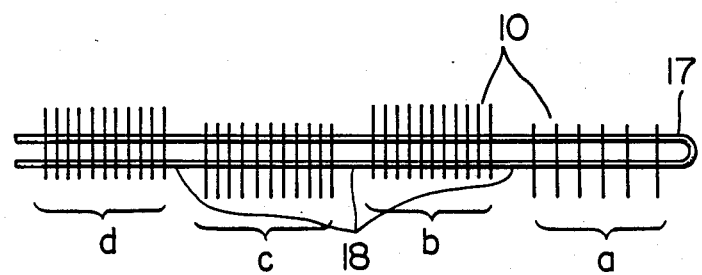
FIG. 8 is a plan view showing the third step of the present method.
Figure 9:
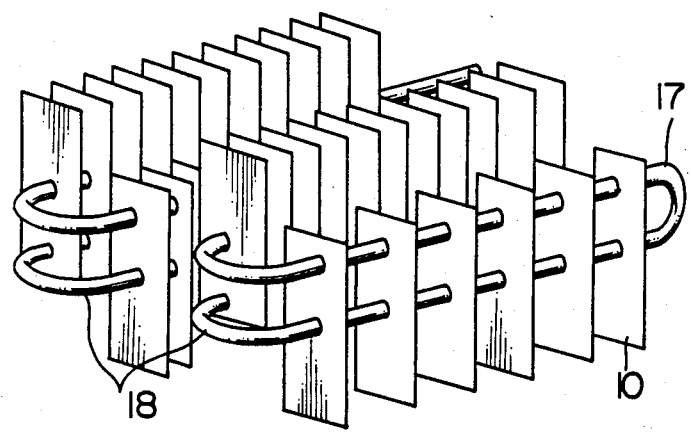
FIG. 9 is a perspective view showing the fourth step of the present method.

The assembly thus formed is taken out of the fin positioning fixture 14, as shown in FIG. 8. Then, in the fourth step of the method, the refrigerant pipe 17 is bent substantially in arcuate shape as at 18 as shown in FIG. 9 such that the bent bent refrigerant pipe 17 in transverse cross-section occupies respective corners of squares. In this state, the rows of the plate fins 10 are arranged in parallel with one another with gaps P therebetween such that the longer ends 12 in one row and the shorter ends 13 in the next row are offset relative to one another, as shown in FIG. 10.

Figure 10:
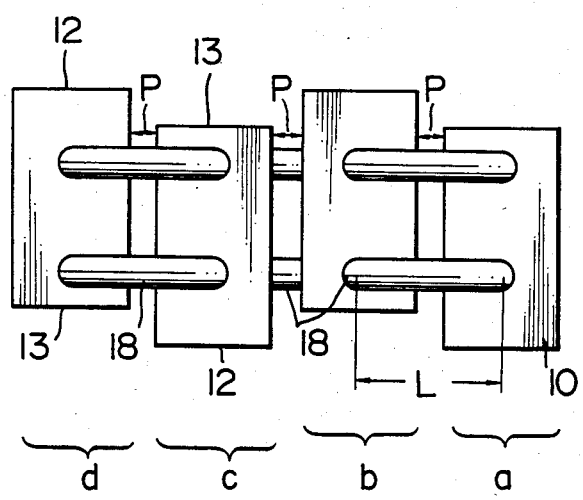
FIG. 10 is a side elevational view showing the fourth step of the present method.
Figure 11:
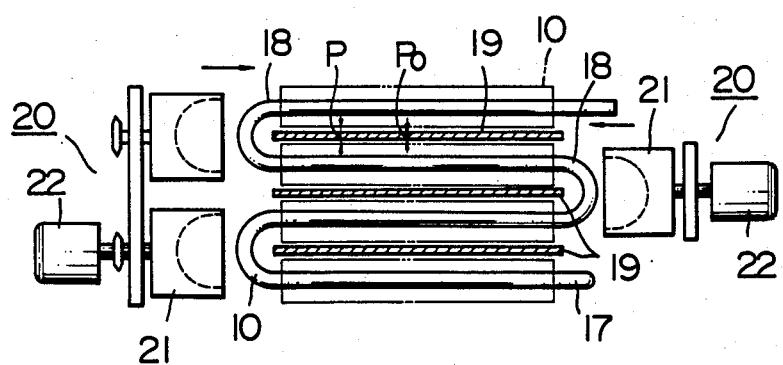
FIG. 11 is a plan view showing the fifth step of the present method prior to setting.
Figure 12:
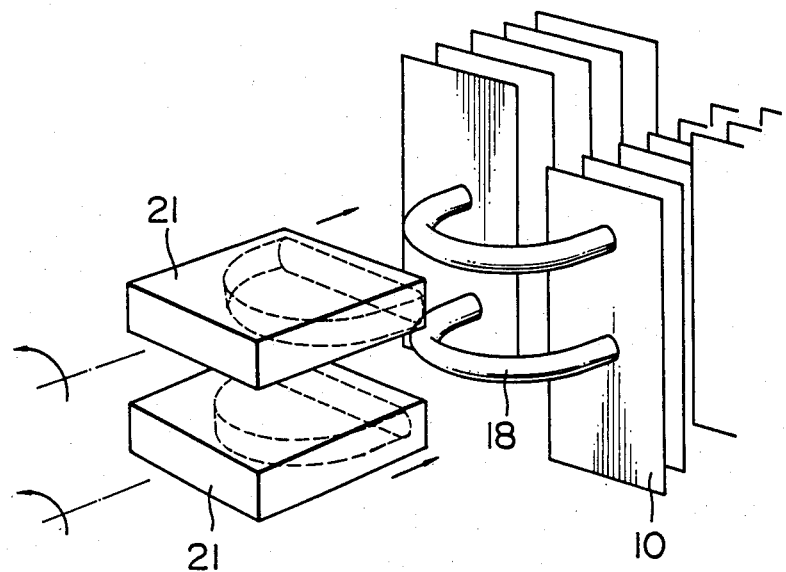
FIG. 12 is a partial perspective view showing the fifth step of the present method prior to twisting.
Figure 13:
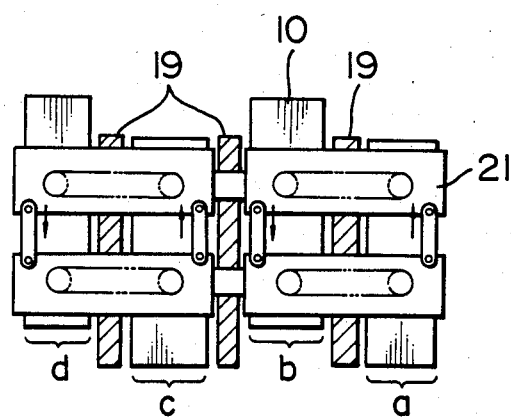
FIG. 13 is a side elevational view showing the fifth step of the present method prior to twisitng.
Figure 14:
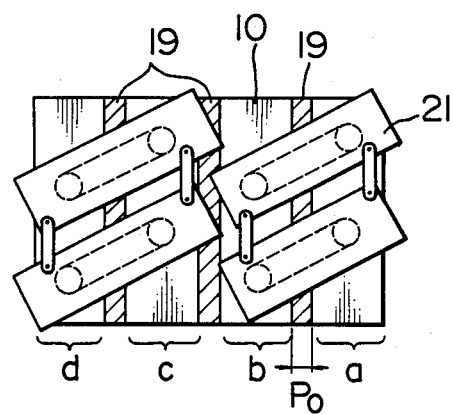
FIG. 14 is a side elevational view showing the fifth step of the present method after twisting.
Figure 15:
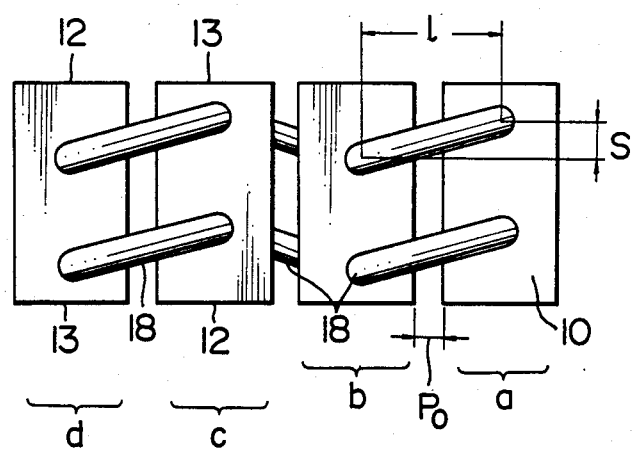
FIG. 15 is a side elevational view of the finished heat exchanger.

Namely, when the plate fins 10 are placed on the fin positioning fixture 14 as described above in connection with the second step, a large row pitch L is provided between the respective rows a to d of the plate fins 10 to accommodate bending of the refrigerant pipe 17 so that, after the bending of the refrigerant pipe 17 in the fourth step, the refrigerant pipe 17 in transverse cross-section occupies corners of squares at a row pitch L as shown in FIG. 10. The row pitch L is selected to meet the equation $L=\sqrt{l^2+s^2}$ where l represents the row pitch in the final product and s represents the distance of twisting of the refrigerant pipe 17, as shown in FIG. 15. By selecting the row pitch L to meet the above equation, it is possible to eliminate any deformation such as flattening, collapsing and so forth of the bent portions 18 of the refrigerant pipe 17 as well as cracks in the same.

Subsequently, in a fifth step of the process, as shown in FIGS. 11 to 14, spacers 19 having a thickness Po, corresponding to the distance between the opposing edges of the plate fins 10 in adjacent rows in the finished product, are placed in the gaps P between the opposing edges of the plate fins 10 in adjacent rows, and the bent portions 18 of the refrigerant pipe 17 are held by means of holders 21 of a twisting apparatus 20. Thereafter, torque is imparted to all the holders 21 by means of a motor 22 mounted on the twisting apparatus 20. Thus, a couple of forces are applied to the straight portions of the refrigerant pipe 17, so that portions of the refrigerant pipe 17 are twisted together with the plate fins 10 in the plane of the fins. The twisting of the plate fins 10, however, is prevented by the spacers 19. Consequently, only the refrigerant pipe 17 is twisted, by a twisting distance s, such that the upper or lower ends of the plate fins in the rows a to d are flush with one another. The relative twisting movement between the inner surfaces of the pipe-receiving holes 3 in the plate fins 10 and the outer peripheral surfaces of the straight portions of the refrigerant pipe 17 is conveniently accommodated by a slight slip produced therebetween. After this twisting operation, the assembly is taken out of the twisting apparatus 20 and the spacers 19 are withdrawn from respective spaces between adjacent rows of the plate fins 10, so that the evaporator is completed to have a staggered arrangement of the refrigerant pipe 17 as shown in FIG. 15.

As will be understood from the foregoing description, the present invention offers the following advantages.

(1) The heat exchanger having a staggered arrangement of the refrigerant pipe can be provided by the present method which involves substantially the same steps as those of the conventional method. The staggered arrangement of the refrigerant pipes causes turbulence in the air flow and can diminish the formation of the dead water zones behind each refrigerant pipe.

(2) It is possible to provide a staggered arrangement of the refrigerant pipe which ensures a high heat exchanging performance merely by adding a simple step of twisting without causing any dislocation of the fins.

(3) The slip between the inner peripheral surfaces of the pipe-receiving holes in the plate fins and the outer peripheral surfaces of the refrigerant pipe is so small that it does not matter substantially.

(4) Defects such as flattening, cracking and so forth in the bent portions of the refrigerant pipe which tend to be cuased in the conventional method can be eliminated and the manufacture itself is facilitated remarkably.

What is claimed is:

1. A method of manufacturing a fin-tube heat exchanger which includes a multiplicity of plate fins arranged in a plurality of rows disposed at a predetermined pitch in the direction of air flow, and a jointless refrigerant pipe extending through said plate fins in a zigzag manner, said method comprising the steps of:

firstly forming at least one pipe-receiving hole in each plate fin in an offset manner relative the center of said each plate fin;

secondly placing said plate fins in fin-receiving grooves formed in a straight fin-positioning fixture at predetermined spacings such that the same longitudinal ends of said plate fins of alternating rows appear on the same side of said fin positioning fixture and that said pipe-receiving holes are linearly aligned;

thirdly inserting said refrigerant pipe into said pipe-receiving holes and expanding said refrigerant pipe into tight and close contact with said plate fins;

fourthly bending said refrigerant pipe in such a zigzag manner that the straight portions of said refrigerant pipe are arranged along at least one straight line, as viewed in the direction of the rows, with each said at least one straight line passing through a straight portion in every row, and that a predetermined spacing is provided between the opposing edges of said plate fins in adjacent rows; and fifthly imparting a twist to said refrigerant pipe to line up said plate fins and arrange said refrigerant pipe such that the straight portions thereof are positioned in a staggered manner, as viewed in the direction of the rows, with each said at least one line becoming altered.

2. A method as set forth in claim 1 wherein said fourth step is conducted in such a manner as to provide a larger pitch of the straight portions of said refrigerant pipe than that in the staggered arrangement of the straight portions of said refrigerant pipe following said fifth step.

3. A method as set forth in claim 1 wherein said fifth step comprises placing spacers between the opposing edges of plate fins in adjacent rows before imparting the twisting force.

4. A method as set forth in claim 1 wherein the twisting force is imparted only to the straight portions of said refrigerant pipe.

5. A method as set forth in claim 1, wherein said refrigerant pipe has bent portions joining the straight portions of adjacent rows upon completion of said fourth step, and wherein said fifth step comprises grasping said bent portions with holders, and twisting the holders.

6. A method as set forth in claim 1, wherein each plate fin has two ends, and wherein the first step is conducted so that the distance between one end and the nearest of said at least one pipe-receiving hole thereto is different from the distance between the other end and the nearest of said at least one pipe receiving hole thereto.

7. A method as set forth in claim 6, wherein said fin-tube heat exchanger has at least first, second, and third rows of plate fins; wherein said first step is accomplished by forming first and second pipe-receiving holes in each plate fin at different distances from the center thereof; wherein said third step is conducted by inserting a generally U-shaped refrigerant pipe having first and second straight legs, the first leg being inserted into the first pipe-receiving holes in each plate fin of said first and third rows and into the second pipe-receiving holes in each plate fin of said second row, and the second leg being inserted in the second pipe-receiving hole in each plate fin of said first and third rows and into the first pipe-receiving holes in each plate fin of said second row; wherein said fourth step is conducted by bending said refrigerant pipe in such a zigzag manner that the straight portions of said first leg are arranged along a first straight line as viewed in the direction of the rows and the straight portions of said second leg are arranged along a second straight line as viewed in the direction of the rows, said first and second lines being parallel; and wherein both of said first and second lines are altered in said fifth step by becoming zigzagged, said first zigzagged line having straight segments that are parallel to adjacent straight segments of said second zigzagged line, said adjacent segments being of equal length.

8. A fin-tube heat exchanger made by the method of claim 7.

9. A fin-tube heat exchanger made by the method of claim 1.

* * * * *